Figure 1:
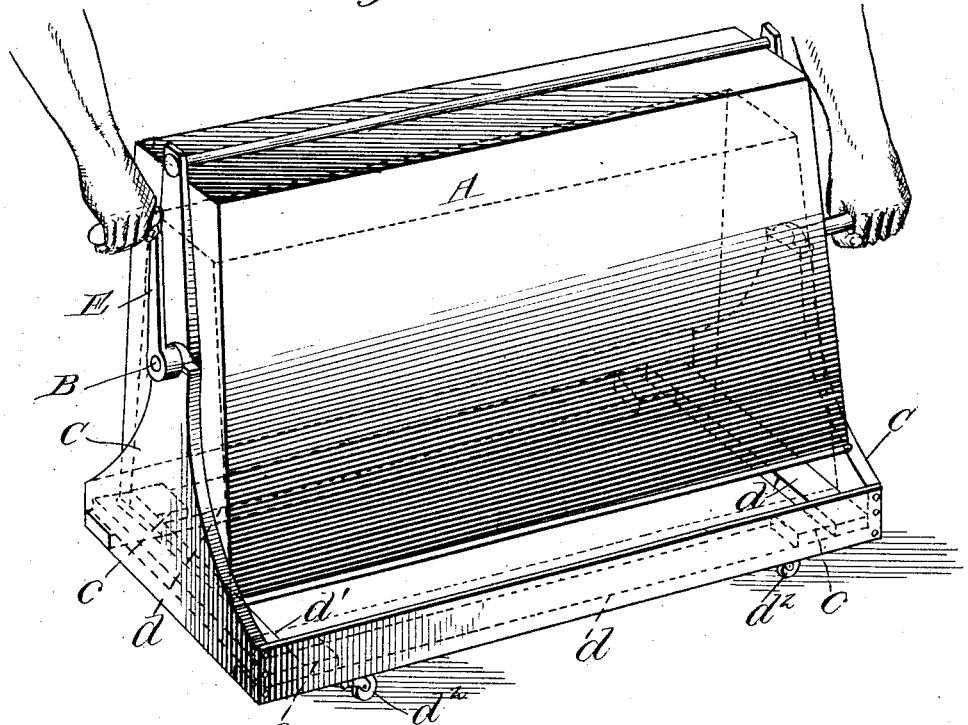

No. 785,753. PATENTED MAR. 28, 1905.
J. McMULLIN.
MOLD.
APPLICATION FILED FEB. 13, 1904. RENEWED JAN. 19, 1905.

2 SHEETS—SHEET 1.

Witnesses:
H. S. Gaither
Reuben Q. Brown

Inventor:
John McMullin
by R. W. Hopkins
R. M. Richards
Attorneys.

No. 785,753.  
PATENTED MAR. 28, 1905.  
J. McMULLIN.  
MOLD.  
APPLICATION FILED FEB. 13, 1904. RENEWED JAN. 19, 1905.  
2 SHEETS—SHEET 2.
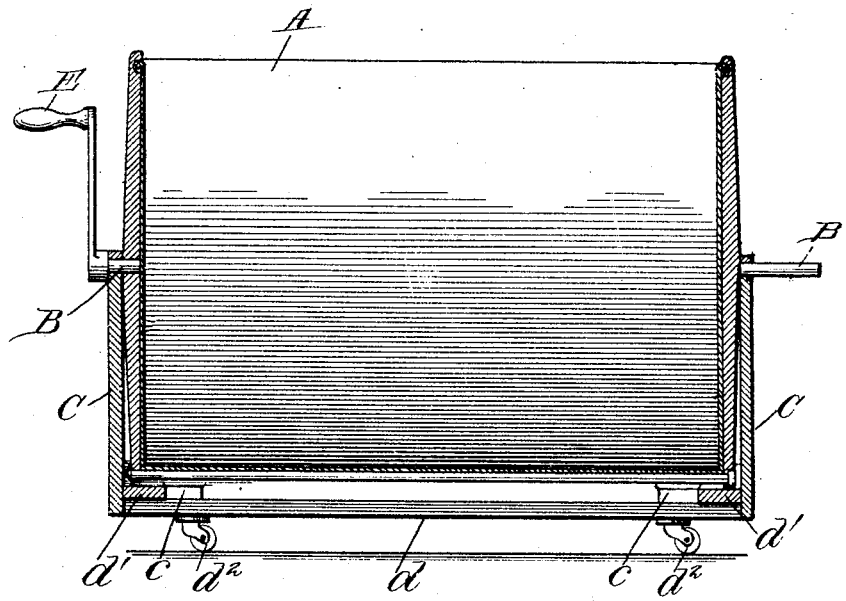
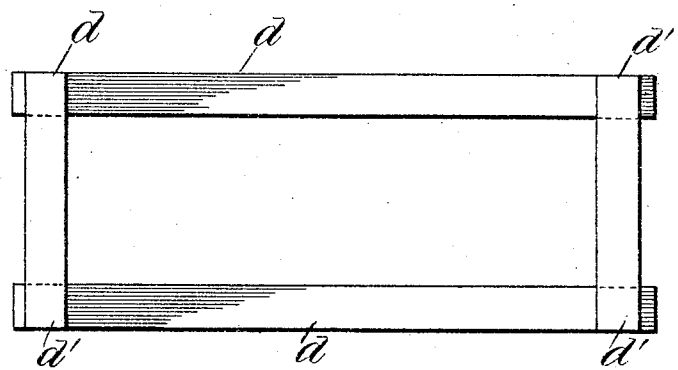
Witnesses.
O. M. Wernich
H. S. Gaither
Inventor:
John McMullin
by L. M. Hopkins and
H. M. Richards
Attorneys.

No. 785,753.

Patented March 28, 1905.

UNITED STATES PATENT OFFICE.

JOHN McMULLIN, OF BURLINGTON, IOWA.

MOLD.

SPECIFICATION forming part of Letters Patent No. 785,753, dated March 28, 1905.

Application filed February 13, 1904. Renewed January 19, 1905. Serial No. 241,785.

*To all whom it may concern:*

Be it known that I, JOHN McMULLIN, a citizen of the United States, residing at Burlington, in the county of Des Moines and State of Iowa, have invented certain new and useful Improvements in Molds, of which the following is a specification.

The present invention relates to a mold in which plastic substances may be molded into cakes, and a mold embodying the invention may be used for any substance or substances that will not attack the material of which the mold is made.

Preferably the mold is made of metal, and for the specific purpose hereinafter described it is made of galvanized sheet-iron; but I desire to have it understood that in this respect the invention is not limited and that any material found most appropriate for the particular use to which the mold is put may be used.

As before intimated, the mold may be used for plastic materials generally. For instance, it may be used for molding wax or wax-like substances, tallow, soap, and the like. My original aim was to provide a mold which is especially adapted for use in molding soap, and hence the following description will be confined to this application of the invention, with the understanding, however, that the invention has nothing to do with the particular material in connection with which it is used.

Coming now to a consideration of the invention in its application to the manufacture of soap, it may be preliminarily observed that in the process of manufacturing soap the separate ingredients are contained in separate receptacles, each having appropriate devices for discharging its contents and that the molds are placed first under one and then under another of these receptacles throughout the entire series, the proper proportion of each ingredient being discharged into the mold while the latter is in place beneath the receptacle. These molds are usually of such size that when filled they can be easily handled manually without the aid of machinery. Preferably each mold is mounted on a truck, so that it may be conveniently advanced from one to another of the receptacles containing the ingredients.

The invention contemplates that the molds may be advanced in the manner described and having been filled allowed to remain until the contents freezes or solidifies.

The invention of the present application relates to a mold which is supported by trunnions mounted on a suitable frame, so that when the mold is full and the contents solidified it may be inverted on its trunnion, so as to permit the contents to escape onto a suitable support, after which the mold and the frame by which its trunnions are supported may be lifted away. In this form of the invention the mold may have a gradual taper, its dimensions increasing from bottom to top, whereby the discharge of the solidified cake is facilitated. In order to still further facilitate the discharge of the cake, the mold may be subjected to the action of a hot bath or a jet of steam, depending upon the character of the material.

The invention consists in the features of novelty that are hereinafter described with reference to the accompanying drawings, which are made a part hereof, and in which—

Figure 2:
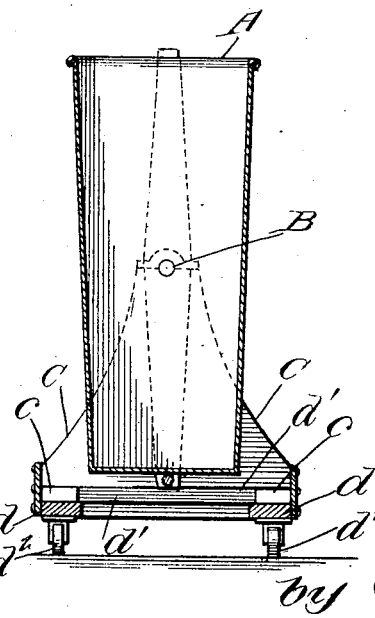

Figure 1 is a perspective view of a mold embodying the invention, the position of the hands and arms of the operator when inverting the mold or when lifting it to free it from the cake being indicated by dotted lines. Figs. 2 and 3 are vertical sections of the mold in planes at right angles to each other. Fig. 4 is a plan view of the truck or carriage by which the frame of the mold is supported.

A represents the mold proper, which, as here shown, is flared vertically, as already suggested. At its ends and somewhat above the center of gravity it is provided with elongated trunnions, which are supported by the uprights C of a removable open frame, which may be of any desired construction so long as it maintains the uprights in proper relations to each other and to the trunnions and is sufficiently open at bottom to permit the molded cake to pass through it. The frame is supported by a truck D, which preferably consists of two longitudinal side bars $d$ and two transverse end bars $d'$, the truck as a whole being mounted upon casters or other carrying-wheels $d^2$. As shown in the drawings, the transverse end bars $d'$ are superposed upon the side bars $d$, so that when the mold is inverted the cake will fall out of it, pass through the open bottom of the frame, and come to rest upon the transverse end bars $d'$.

As shown in the drawings, the trunnions are extended a considerable distance beyond the uprights C of the frame, so that when the mold is inverted the trunnions may be grasped by the operator, whereby they serve as convenient means for lifting the mold and its supporting-frame, thus leaving the cake resting upon the truck.

If desired, although this is not necessary, one of the trunnions may be provided with a crank E for assisting in inverting the mold.

The frame rests upon and is supported by a truck. As shown more clearly in Fig. 2, it is provided with lugs $c$, which engage the inner edges of the end bars $d'$ of the truck and prevent its longitudinal displacement, and in addition to this the frame has longitudinally-disposed side bars $c'$, which prevent its lateral displacement.

What I claim as new, and desire to secure by Letters Patent, is—

1. In a device of the class described, the combination of a truck, an open frame removably supported by the truck, and an invertible mold having trunnions supported by the frame, said frame being open at bottom to permit the molded cake to pass through it and on to the truck when the mold is inverted, substantially as described.

2. In a device of the class described, the combination of a truck having longitudinal side bars and superposed transverse end bars, an open frame removably supported by said truck, said truck and frame having engaging features for preventing their relative horizontal displacements, and an invertible mold having trunnions supported by the frame, said frame being open at bottom to permit the molded cake to pass through it and on to a truck, substantially as described.

3. In a device of the class described, the combination of a mold, trunnions by which it is adapted to be supported, a frame adapted to support the trunnions, the trunnions being extended beyond the frame far enough to provide grips for the hands of the operator, and a truck by which the frame is supported, said truck being adapted to receive the discharged cake when the mold is inverted, substantially as described.

JOHN McMULLIN.

Witnesses:
   THOS. A. NICHOLS,
   W. A. PLOCK.